US007720046B2

(12) United States Patent
Chen et al.

(10) Patent No.: US 7,720,046 B2
(45) Date of Patent: May 18, 2010

(54) SYNCHRONIZING A CHANNEL CODEC AND VOCODER OF A MOBILE STATION

(75) Inventors: Shaojie Chen, Austin, TX (US); Guner Arslan, Austin, TX (US)

(73) Assignee: ST-Ericsson SA, Geneva (CH)

( * ) Notice: Subject to any disclaimer, the term of this patent is extended or adjusted under 35 U.S.C. 154(b) by 1264 days.

(21) Appl. No.: 11/253,469

(22) Filed: Sep. 23, 2005

(65) Prior Publication Data

US 2007/0073535 A1 Mar. 29, 2007

(51) Int. Cl.
*H04J 3/06* (2006.01)

(52) U.S. Cl. ........................ 370/350; 704/200; 704/201; 370/503; 370/468; 370/352; 455/423; 375/242; 375/372

(58) Field of Classification Search ................. 704/221, 704/200, 201; 455/419; 370/468, 503
See application file for complete search history.

(56) References Cited

U.S. PATENT DOCUMENTS 5,426,643 A 6/1995 Smolinske et al. ....... 370/105.3
5,586,119 A 12/1996 Scribano et al. ............. 370/350
5,768,314 A * 6/1998 Kapadia et al. ............. 375/242
6,658,027 B1 12/2003 Kramer et al. .............. 370/516
7,512,157 B2 * 3/2009 Anderton et al. ............ 370/503
2002/0006138 A1 * 1/2002 Odenwalder ................ 370/468
2002/0177436 A1 * 11/2002 Lemieux ..................... 455/423
2003/0002609 A1 1/2003 Faller et al. ................. 375/372
2004/0062274 A1 * 4/2004 Hakansson et al. .......... 370/468
2004/0267519 A1 * 12/2004 Sjoberg et al. .............. 704/201
2006/0268837 A1 * 11/2006 Larsson et al. .............. 370/352

OTHER PUBLICATIONS

Dent, Peter. "GSM Adaptive Multi-Rate Voice Coding on the TMS320C62x™ DSP". Application Report SPRA625—Feb. 2000.
U.S. Appl. No. 11/153,065, filed Jun. 15, 2005, entitled "Synchronizing A Modem and Vocoder Of A Mobile Station" by David O. Anderton; Jeffrey Yiin.

* cited by examiner

*Primary Examiner*—Lester Kincaid
*Assistant Examiner*—Charles Shedrick
(74) *Attorney, Agent, or Firm*—William J. Kubida; Michael C. Martensen; Hogan & Hartson LLP

(57) ABSTRACT

In one embodiment, the present invention includes a method for maintaining a vocoder and channel codec in substantial synchronization. The method may include receiving a configuration message that includes rate information and an effective radio block identifier at a mobile station, coding a current radio block via a vocoder and channel codec, configuring an encoding portion of the vocoder and channel codec with the rate information after performing the coding, and then coding the effective radio block using the rate information. Other embodiments are described and claimed.

15 Claims, 6 Drawing Sheets

SYNCHRONIZING A CHANNEL CODEC AND VOCODER OF A MOBILE STATION

FIELD OF THE INVENTION

The present invention relates to data processing and more particularly to speech processing in a wireless device.

BACKGROUND

Wireless devices or mobile stations such as cellular handsets and other wireless systems transmit and receive representations of speech waveforms. A physical layer of a cellular handset typically includes circuitry for performing two major functions, namely encoding and decoding. This circuitry includes a channel codec for performing channel encoding and decoding functions and a vocoder for performing voice encoding and decoding functions. The vocoder performs source encoding and decoding on speech waveforms. Source coding removes redundancy from the waveform and reduces the bandwidth (or equivalently the bit-rate) in order to transmit the waveform in real-time. The channel codec increases redundancy in the transmitted signal to enhance the robustness of the transmitted signal. Synchronizing these two functions allows the system to operate properly.

A number of different wireless protocols exist. One common protocol is referred to as global system for mobile communications (GSM). In a GSM system, the vocoder operates on blocks of speech data that are 20 milliseconds (ms) in duration. The channel codec transmits and receives data every 4.615 ms. Since the speech encoder (i.e., vocoder) serves as a data source to the channel encoder/modulator (i.e., channel codec) and the speech decoder (i.e., vocoder) serves as the data sink for the channel demodulator/decoder (i.e., channel codec), the vocoder and channel codec should be maintained in synchronization.

Further, the speech encoder should deliver data to the channel encoder with sufficient time margin to complete channel encoding and modulation operations before the time at which the data are transmitted over the air. Further complicating the issue are limits on the round-trip delay of the overall communications link. Hence, the vocoder cannot deliver the data too early lest the delay budget (such as that set forth by the European Telecommunications Standards Institute (ETSI)) be violated, and cannot deliver data too late lest the data be discarded. As a practical matter, the later the vocoder delivers data to the channel codec, the harder a digital signal processor (DSP) must work to complete all signal processing on schedule, thus creating a greater system load.

Adaptive multi-rate (AMR) vocoders have been introduced recently in certain cellular communication standards, such as GSM and WCDMA. AMR vocoders support multiple source rates, and compared to other vocoders, provide some technical advantages. These advantages include more effective discontinuous transmission (DTX) because of an in-band signaling mechanism, which allows for powering down a transmitter when a user of a cellular phone is not speaking. In such manner, prolonged battery life and reduced average bit rate, leading to increased network capacity is provided. AMR also allows for error concealment.

In a system supporting AMR, the bit rate of network communications can be controlled by the radio access network depending upon air interface loading and the quality of speech conditions. To handle such different bit rates, the network will send configuration messages to a cellular phone to control its transmission at a selected bit rate. During an AMR voice call, the network may send a message to the mobile station to change the AMR configuration (e.g., source rate). Since both the channel codec and vocoder use this information, careful synchronization is needed between the codec and vocoder during AMR configuration changes.

Accordingly, methods and apparatus to maintain synchronization between channel codec and vocoder would improve performance of a mobile station.

SUMMARY OF THE INVENTION

In one embodiment, the present invention includes a method for maintaining a vocoder and channel codec in substantial synchronization. The method may include receiving a configuration message that includes rate information and an indicator corresponding to an effective radio block for application of the rate information at a mobile station, coding a current radio block via a speech encoder and a channel encoder, configuring the speech encoder and the channel encoder with the rate information after performing the coding, and then coding the effective radio block with the rate information. In other embodiments, a different priority of configuration activities may be implemented to maintain the vocoder and channel codec in substantial synchronization.

Other embodiments may be implemented in an apparatus, such as an integrated circuit (IC). The IC may include a vocoder to encode speech blocks and a channel encoder coupled to the vocoder to channel encode the encoded speech blocks. In various embodiments, configuration information may be applied to the vocoder and channel codec to maintain them in substantial synchronization. More specifically, the configuration information may be applied according to a priority to maintain the synchronization, while at the same time performing coding and decoding operations on outgoing and incoming radio blocks in accordance with rate information, for example, indicated by a network. As an example, the IC may take the form of a digital signal processor.

Embodiments of the present invention may be implemented in appropriate hardware, firmware, and software. To that end, a method may be implemented in hardware, software and/or firmware to synchronize a channel codec and vocoder, e.g., of a wireless device. The method may perform various functions including receiving a configuration message from a network at a wireless device and configuring the channel codec and vocoder based upon the configuration message according to a priority so that the channel codec and the vocoder operate in synchronization. For example, the priority may cause the device to schedule encoding configuration prior to decoding configuration. Furthermore, the priority may further schedule the encoding configuration before transmission of an effective radio block for the new configuration, and schedule the decoding configuration after decoding of a radio block immediately prior to the effective radio block.

In one embodiment, a system in accordance with an embodiment of the present invention may be a wireless device such as a cellular telephone handset, personal digital assistant (PDA) or other mobile device. Such a system may include a transceiver, as well as digital circuitry. The digital circuitry may include circuitry such as an IC that includes at least some of the above-described hardware, as well as control logic to implement the above-described methods.

DETAILED DESCRIPTION

Figure 1:
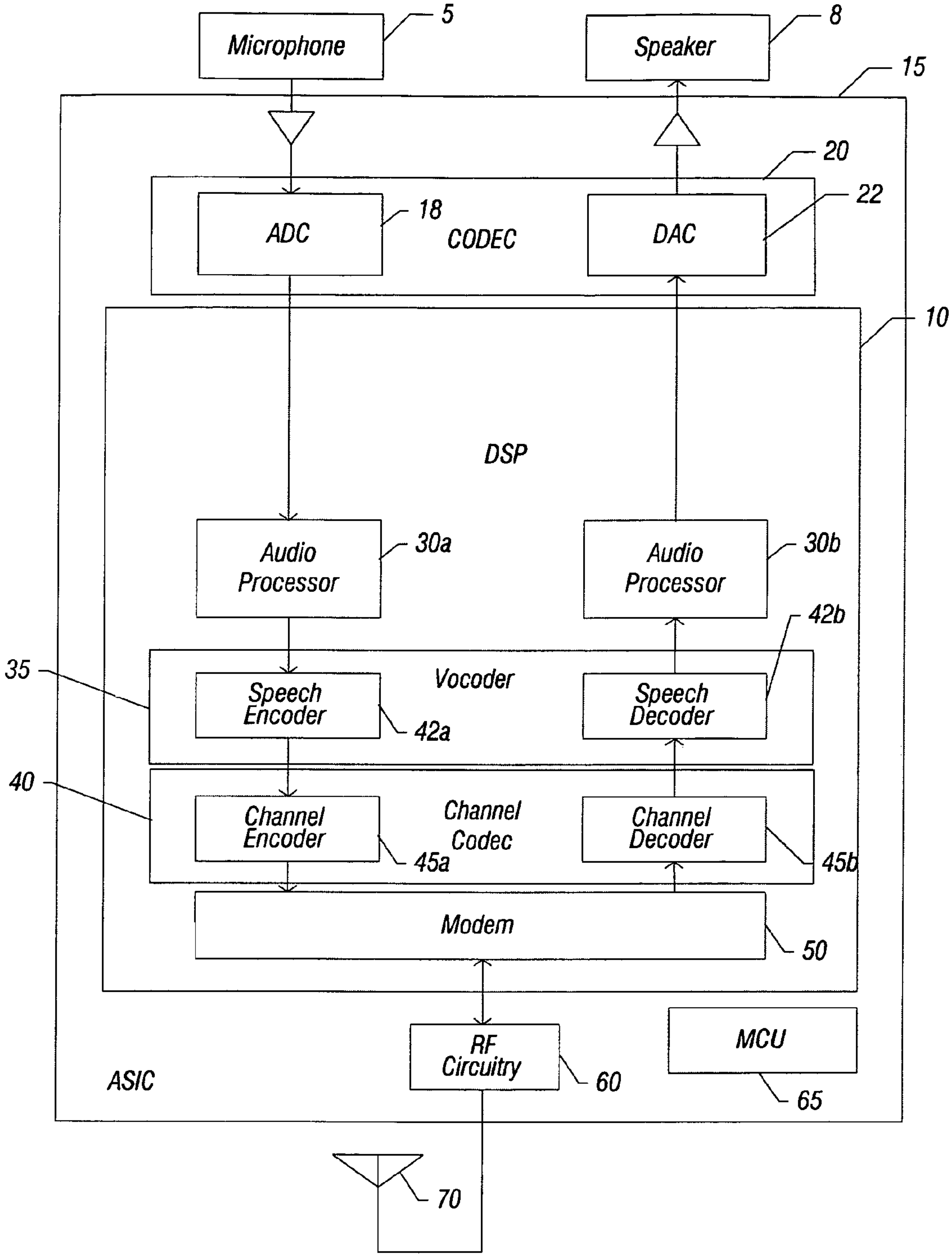
FIG. 1 is a block diagram of an audio signal processing path in a wireless device in accordance with an embodiment of the present invention.

Referring to FIG. 1, shown is a block diagram of a signal processing path in a wireless device in accordance with an embodiment of the present invention. Such a transmission chain may take the form of multiple components within a cellular handset or other mobile station, for example. As shown in FIG. 1, an application specific integrated circuit (ASIC) 15 may include both baseband and radio frequency (RF) circuitry. The baseband circuitry may include a digital signal processor (DSP) 10. DSP 10 may process incoming and outgoing audio samples in accordance with various algorithms for filtering, coding, and the like.

While shown as including a number of particular components in the embodiment of FIG. 1, it is to be understood that DSP 10 may include additional components and similarly, some portions of DSP 10 shown in FIG. 1 may instead be accommodated outside of DSP 10. It is also to be understood that DSP 10 may be implemented as one or more processing units to perform the various functions shown in FIG. 1 under software control. That is, the functionality of the different components shown within DSP 10 may be performed by common hardware of the DSP according to one or more software routines. As further shown in FIG. 1, ASIC 15 may further include a microcontroller unit (MCU) 65. MCU 65 may be adapted to execute control applications and handle other functions of ASIC 15.

DSP 10 may be adapted to perform various signal processing functions on audio data. In an uplink direction, DSP 10 may receive incoming voice information, for example, from a microphone 5 of the handset and process the voice information for an uplink transmission. This incoming audio data may be converted from an analog signal into a digital format using a codec 20 formed of an analog-to-digital converter (ADC) 18 and a digital-to-analog converter (DAC) 22, although only ADC 18 is used in the uplink direction. In some embodiments, the analog voice information may be sampled at 8,000 samples per second or 8 kHz. The digitized sampled data may be stored in a temporary storage medium (not shown in FIG. 1). In some embodiments, one or more such buffers may be present in each of an uplink and downlink direction for temporary sample storage.

The audio samples may be collected and stored in the buffer until a complete data frame is stored. While the size of such a data frame may vary, in embodiments used in a time division multiple access (TDMA) system, a data frame (also referred to as a “speech frame”) may correspond to 20 ms of real-time speech (e.g., corresponding to 160 speech samples). In various embodiments, the input buffer may hold 20 ms or more of speech data from ADC 18. As will be described further below, an output buffer (not shown in FIG. 1) may hold 20 ms or more of speech data to be conveyed to DAC 22.

The buffered data samples may be provided to an audio processor 30*a* for further processing, such as equalization, volume control, fading, echo suppression, echo cancellation, noise suppression, automatic gain control (AGC), and the like. From front-end processor 30*a*, data is provided to a vocoder 35 for encoding and compression. As shown in FIG. 1, vocoder 35 may include a speech encoder 42*a* in the uplink direction and a speech decoder 42*b* in a downlink direction. Vocoder 35 then passes the data to a channel codec 40 including a channel encoder 45*a* in the uplink direction and a channel decoder 45*b* in the downlink direction. From channel encoder 45*a*, data may be passed to a modem 50 for modulation. The modulated data is then provided to RF circuitry 60, which may be a transceiver including both receive and transmit functions to take the modulated baseband signals from modem 50 and convert them to a desired RF frequency (and vice versa). From there, the RF signals including the modulated data are transmitted from the handset via an antenna 70.

In the downlink direction, incoming RF signals may be received by antenna 70 and provided to RF circuitry 60 for conversion to baseband signals. The transmission chain then occurs in reverse such that the modulated baseband signals are coupled through modem 50, channel decoder 45*b* of codec 40, vocoder 35 (and more specifically speech decoder 42*b*), audio processor 30*b*, and DAC 22 (via a buffer, in some embodiments) to obtain analog audio data that is coupled to, for example, a speaker 8 of the handset.

For purposes of further illustration, the discussion is with respect to a representative GSM/GPRS/EDGE/TDMA system (generally a “GSM system”). However, other protocols may implement the methods and apparatus disclosed herein, particularly where shared configuration information is to be updated in both voice and channel codecs.

Figure 2A:
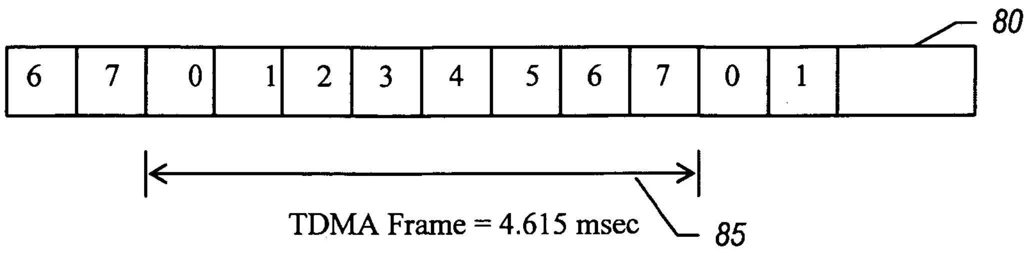
FIG. 2A is a time division multiple access (TDMA) frame structure of a multi-slot communication standard.

A GSM system makes use of a TDMA technique, in which each frequency channel is further subdivided into eight different time slots numbered from 0 to 7. Referring now to FIG. 2A, shown is a timing diagram of a multi-siot communication 80. As shown in FIG. 2A, multi-slot communication 80 includes a TDMA frame 85 having eight time slots in which the frequency channel of TDMA frame 85 is subdivided. Each of the eight time slots may be assigned to an individual user in a GSM system, while multiple slots can be assigned to one user in a GPRS/EDGE system. A set of eight time slots is referred to herein as a TDMA frame, and may be a length of 4.615 ms.

Figure 2B:
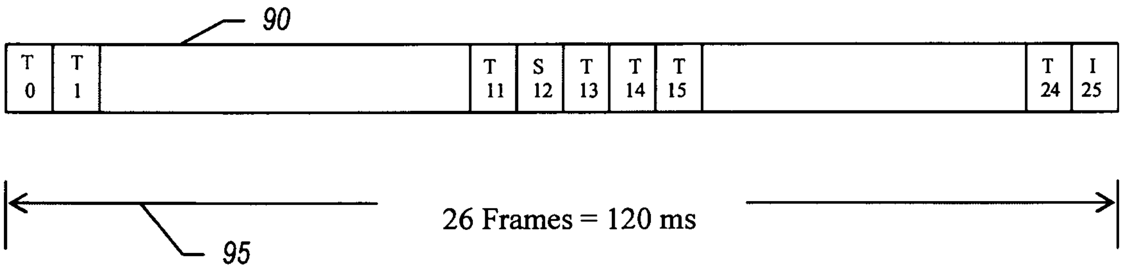
FIG. 2B is a multi-frame structure used for a traffic channel of a multi-slot communication standard.

A 26-multiframe is used as a traffic channel frame structure for the representative system. Referring now to FIG. 2B, shown is a multiframe communication 90 that includes a 26-multi-frame formed of 26 individual TDMA frames T0-I25. As shown in FIG. 2B, the first 12 frames (T0-T11) are used to transmit traffic data. A frame (S12) is used to transmit a slow associated control channel (SACCH), which is then followed by another 12 frames of traffic data (T13-T24). The last frame (I25) stays idle. Note that the SACCH and idle frame can be swapped. The total length of a 26-frame structure is 26*4.615 ms=120 msec.

In a GSM system, a speech frame is 20 msec while a radio block is 4 TDMA frames, which is 4*4.615=18.46 msec. Data output from a speech codec is to be transmitted during the next radio block, and every three radio blocks, the TDMA frame or radio block boundary and the speech frame boundaries are aligned.

Consider a first radio block N, e.g., frame 0 to frame 3 (T0-T3) of frame structure 90 of FIG. 2B. In an uplink side, a channel encoding (CHE) for block N should be completed before the transmit slot of the first frame of the radio block, frame 0 in this case. Similarly, speech encoding (SPE) for block N should be completed before the channel encoder starts so that the payload data for block N is ready to be encoded. In a downlink side, channel decoding (CHD) for block N may start after receipt of the last frame of the radio block, frame 3 in this case, while speech decoding (SPD) for block N may start after channel decoding is completed. In various embodiments, this synchronization between channel codec and vocoder may be maintained for all blocks in order to permit proper system execution.

During an AMR voice call, the network may send a message to the mobile station to request the mobile station to change its AMR configuration. Typically, the configuration message includes rate information (e.g., a new transmission rate) and an identification of a given radio block (corresponding to a transmission time) at which the rate information is to take effect. In order to apply a new AMR configuration, a software routine may be implemented. In one embodiment the routine, AMR configure (AMRCFG), may be used to apply AMR configuration for uplink and downlink. For ease of discussion, configuration for the uplink side may be also referred to herein as ACU and configuration for the downlink side may be also referred to herein as ACD.

In various embodiments, configuration information may be applied according to task execution priorities within the cellular transmission cycle. For example, in one embodiment a task execution priority may proceed as follows: channel encoding may have a highest priority; configuration (i.e., in uplink and downlink directions) may have a next priority; channel decoding may have a next lower priority; and finally, speech encoding/decoding may have a lowest priority. While described with this particular priority in one embodiment, it is to be understood that other priorities may be present in other embodiments. Furthermore, in different embodiments task executions may be moved relative to a given execution priority for multiple radio blocks. That is, in some embodiments tasks for a first block may be performed before tasks (including configuration/reconfiguration) for a subsequent radio block.

Consider now an example where a network sends a configuration message, e.g., an AMR configuration message to a cellular phone. Furthermore, assume that the message instructs the phone to apply the new configuration information to a next radio block N+1. At a frame interrupt for the first TDMA frame of a current radio block N, a DSP kernel schedules channel encoding for block N and ACU. Accordingly, channel encoding for block N and reconfiguration of the speech encoder and channel encoder may be performed during transmission of block N. At the frame interrupt for the first TDMA frame of radio block N+1, the DSP kernel schedules channel encoding for block N+1 (implicitly, speech encoding for block N+1 occurs prior to the channel encoding). Because of the task execution priority, the execution sequence for this example may occur as follows:

CHE for block N;
ACU (AMRCFG for uplink);
SPE for block N+1; and
CHE for block N+1.

In various embodiments, ACU may be performed such that the new configuration is applied to the speech encoder first and then to the channel encoder so that the speech encoder and channel encoder are synchronized.

Figure 3:
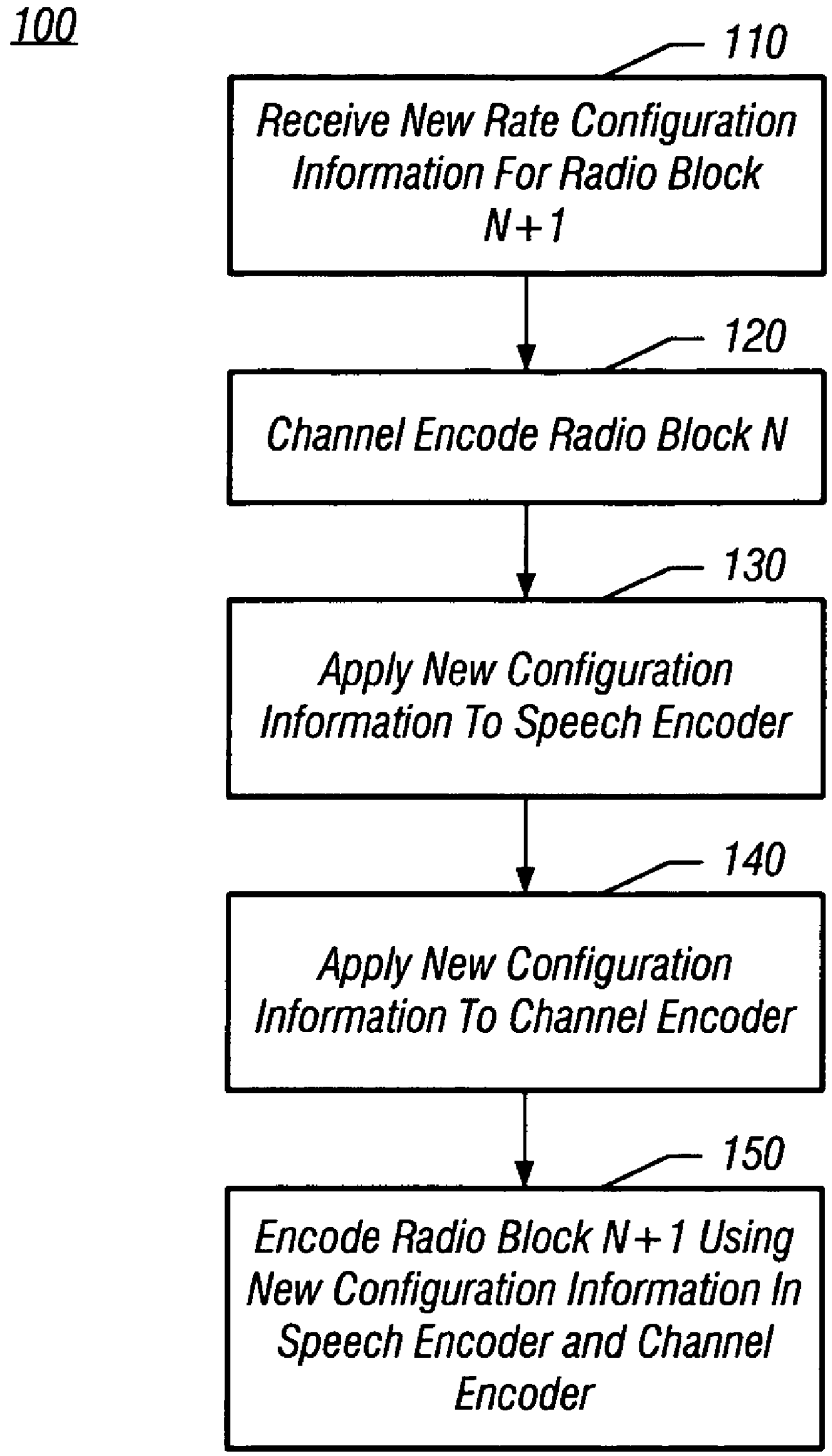
FIG. 3 is a flow diagram of a configuration method for uplink encoders in accordance with one embodiment of the present invention.

Referring now to FIG. 3, shown is a flow diagram of a method in accordance with one embodiment of the present invention. As shown in FIG. 3, method 100 may be used to configure a speech encoder and channel encoder in the uplink direction. While the scope of the present invention is not so limited, in some embodiments these encoders may be configured when a mobile station receives updated rate information such as may be received from a network implementing an adaptive multi-rate system that supports different source rates.

Still referring to FIG. 3, method 100 may begin by receiving new rate configuration information (block 110). For example, a network may determine that, due to network conditions, the mobile station should switch to a new bit rate. Accordingly, the network may send the new rate configuration information that is to be implemented beginning at a predetermined radio block, for example, a next radio block (e.g., N+1) to be encoded in the mobile station. In some embodiments, the configuration information may be stored in a protocol stack of the mobile station.

Next, the current radio block (e.g., radio block N) may be channel encoded using the channel encoder (block 120). As described above, this channel encoding occurs prior to transmission of radio block N. Furthermore, in some embodiments the channel encoding may be scheduled to occur upon receipt of a frame interrupt signal received just prior to the beginning of a transmission period of radio frame N.

To maintain synchronization between speech encoder and channel encoder, the new configuration information may be scheduled to be applied to the speech encoder at a predetermined time after receipt of this frame interrupt signal. That is, to maintain synchronization, the channel encoding of radio block N should occur using the prior configuration information. Furthermore, the channel encoding may be executed with a higher priority than reconfiguration.

Accordingly, at the predetermined time, the new configuration information may be applied to the speech encoder (block 130). For example, in some embodiments the new configuration information may be applied at a predetermined time after receipt of the first frame interrupt signal for radio block N. However the new configuration information may be applied to the speech encoder at various other time instants. Preferably, however, the new configuration information is applied after channel encoding radio block N.

Still referring to FIG. 3, next the new configuration information may be applied to the channel encoder (block 140). For example, the new configuration information may be applied to the channel encoder immediately after applying the new configuration information to the speech encoder. While described with this order in the embodiment of FIG. 3, in other implementations the channel encoder may be reconfigured with the new configuration information prior to the speech encoder. However, in various embodiments the configuration information should be applied to both encoders prior to the time that either of the encoders is to encode radio block N+1.

Finally, radio block N+1 may be encoded using the new configuration information in the speech encoder and channel encoder (block 150). In some embodiments, the speech encoding for radio block N+1 may begin during transmission of radio block N. For example, this speech encoding may begin within a third or fourth TDMA frame of radio block N.

In the downlink side, configuration/reconfiguration of a channel decoder and speech decoder may be performed prior to decoding activities for the block in which configuration information is to be effected. Thus, configuration/reconfiguration may be performed after decoding of a previous block (e.g., block N) and during transmission of the radio block in which the new configuration information is to be effected (e.g., a block N+1), but prior to decoding operations for the block. Then, after receiving the last burst in block N+1, the DSP kernel may schedule configuration events, along with channel decoding and speech decoding. Because of the task execution priority, the execution sequence for this example may occur as follows:

ACD (AMRCFG for downlink);

CHD for block N+1; and

SPD for block N+1.

In various embodiments, ACD may be performed such that the new AMR configuration is applied to the channel decoder first and then to the speech decoder so that the channel decoder and speech decoder are synchronized.

Figure 4:
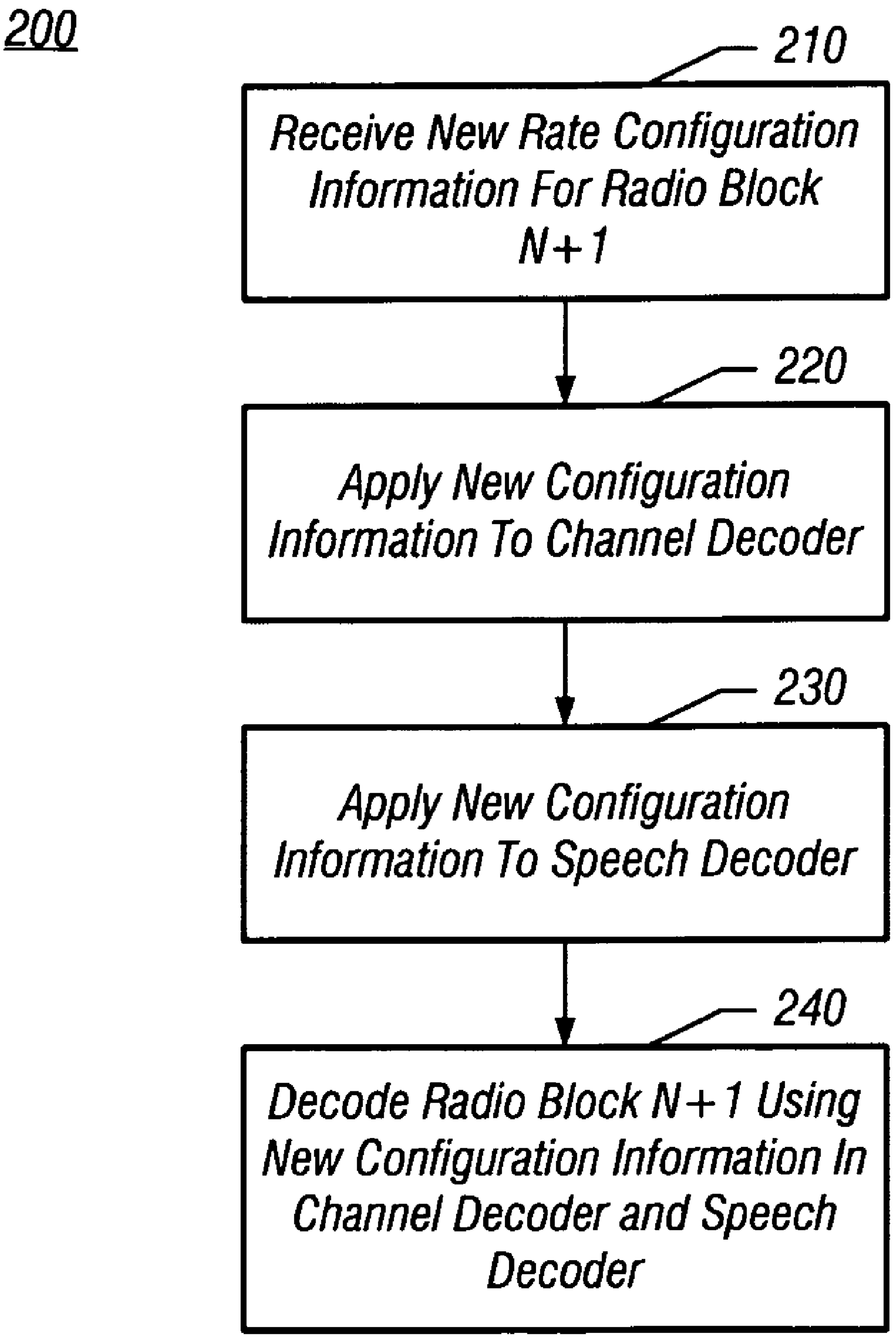
FIG. 4 is a flow diagram of a configuration method for downlink decoders in accordance with one embodiment of the present invention.

Referring now to FIG. 4, shown is a block diagram of a configuration method for downlink decoders in accordance with one embodiment of the present invention. As shown in FIG. 4, method 200 may be used to configure a channel decoder and a speech decoder with, for example, new rate configuration information.

As shown in FIG. 4, method 200 may begin by receiving new rate configuration information for a next radio block (i.e., N+1) to be processed by the decoders (block 210). As one example, the configuration information may be received prior to transmission of a current radio block (i.e., block N). However, the configuration information alternately may be received sometime during transmission of radio block N. As described above, the new rate configuration information may be stored in the protocol stack of the mobile station. Next, the new configuration information may be applied to the channel decoder at a predetermined time (block 220). While reconfiguration of the channel decoder may occur at various times with respect to transmission of radio blocks, in some embodiments the reconfiguration may occur during transmission of radio block N+1. That is, reconfiguration of the channel decoder may occur during transmission of the block that is to be processed with the new configuration information. Still further, while this reconfiguration may occur at various instants within this radio block, in some embodiments reconfiguration may be scheduled with respect to receipt of a frame interrupt for a third TDMA frame within the radio block N+1.

Thereafter, the new configuration information may be applied to the speech decoder (block 230). For example, in some embodiments reconfiguration of the speech decoder may occur immediately following reconfiguration of the channel decoder. Finally, radio block N+1 may be decoded using the new configuration information in the channel decoder and speech decoder (block 240). In various embodiments, channel decoding may occur for the radio block upon receipt of the last TDMA frame (i.e., T7) for radio block N+1. Upon completion of the channel decoding, speech decoding may then be performed. While described with this particular process in the embodiment of FIG. 4, it is to be understood the scope of the present invention is not so limited and configuration or reconfiguration of speech and channel decoders may vary in different embodiments.

Figure 5:
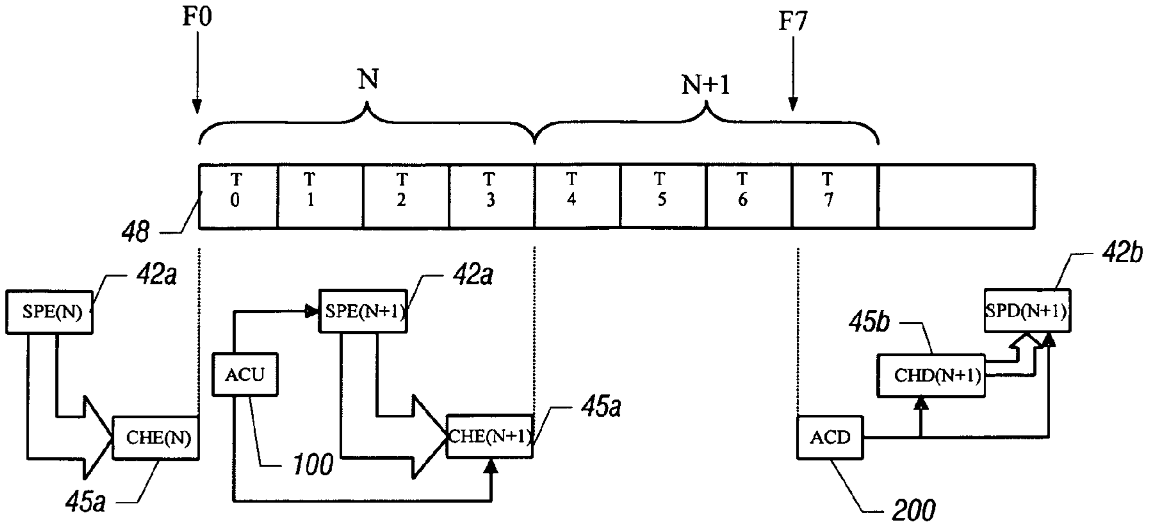
FIG. 5 is a timing diagram for reconfiguration of a vocoder and channel codec in accordance with an embodiment of the present invention.

Referring now to FIG. 5, shown is a timing diagram for reconfiguration of a vocoder and channel codec in accordance with an embodiment of the present invention. As shown in FIG. 5, various coding and configuration events are shown with respect to a transmission sequence 48 that includes transmission of a first radio block N followed by a second radio block N+1 on an antenna of the cellular telephone. As shown in FIG. 5, first speech encoding of radio block N occurs in speech encoder 42*a*. Following completion of speech encoding, the encoded speech data is provided to channel encoder 45*a* for channel encoding of the radio block N data. As shown in FIG. 5, the channel encoding for block N may be completed prior to transmission of the first TDMA frame (T0) of transmission sequence 48. Also shown in FIG. 5, a first frame interrupt (F0) is received immediately prior to transmission of this T0 frame.

Still referring to FIG. 5, next a configuration routine 100 (i.e., an uplink AMR configuration routine (ACU)) may be performed during transmission of radio block N. As an example, ACU 100 may be scheduled upon receipt of the first frame interrupt F0. In one embodiment, the configuration information may first be applied to speech encoder 42*a* and then to channel encoder 45*a*, although the scope of the present invention is not so limited. While the configuration routine 100 may be performed in various manners, in some embodiments routine 100 may be executed in accordance with the flow diagram discussed above with respect to FIG. 3.

Still referring to FIG. 5, after speech encoder 42*a* and channel encoder 45*a* have been reconfigured with new rate information, speech encoding of radio block N+1 may be performed in speech encoder 42*a* during transmission of radio block N. Similarly, channel encoding of radio block N+1 may be performed in channel encoder 45*a* and may be completed prior to transmission of radio block N+1. Further, while not shown in FIG. 5, it is to be understood that channel decoding and speech decoding for radio block N may be performed after receipt of the last burst of radio block N.

Still referring to FIG. 5, in the downlink direction a configuration routine 200 (i.e., a downlink AMR configuration routine (ACD)) may be executed during transmission of radio block N+1. More specifically, in the embodiment of FIG. 5, ACD 200 may be scheduled upon receipt of the eighth frame interrupt F7. In one embodiment, configuration routine 200 may be performed in accordance with the flow diagram described above with respect to FIG. 4. After reconfiguration is completed, channel decoding for radio block N+1 may occur in channel decoder 45*b* and then speech decoding for radio block N+1 may occur in speech decoder 42*b* Specifically, decoding may be performed after receipt of the last burst of radio block N+1. Although described in the embodiment of FIG. 5 for reconfiguration, similar activities may be used to configure the channel codec and vocoder.

Using the embodiments of the present invention, synchronization between channel codec and vocoder may be optimally maintained. Such synchronization may further be maintained during configuration, for example, AMR configuration. Accordingly, embodiments of the present invention may be used to maintain the vocoder and channel codec in substantial synchronization. As used herein, the term "substantial" synchronization means that vocoder and channel codec may be synchronized to a level at which adverse performance effects are avoided.

The methods described herein may be implemented in software, firmware, and/or hardware. A software implementation may include an article in the form of a machine-readable storage medium onto which there are stored instructions and data that form a software program to perform such methods. As an example, a DSP may include instructions or may be programmed with instructions stored in a storage medium to perform channel codec-vocoder synchronization in accordance with an embodiment of the present invention.

Figure 6:
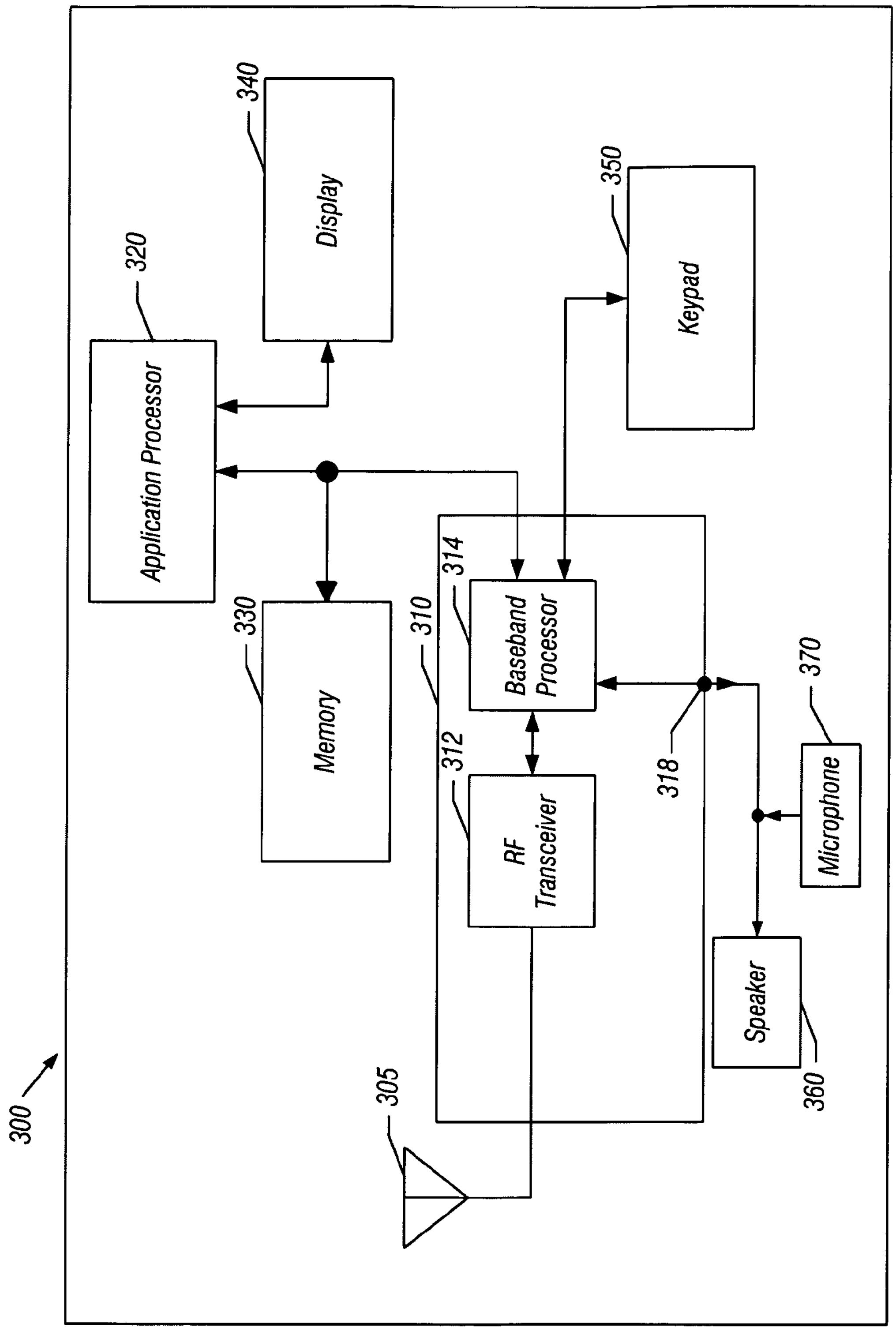
FIG. 6 is a block diagram of a system in accordance with one embodiment of the present invention.

Referring now to FIG. 6, shown is a block diagram of a system in accordance with one embodiment of the present invention. As shown in FIG. 6, system 300 may be a wireless device, such as a cellular telephone, PDA, portable computer or the like. An antenna 305 is present to receive and transmit RF signals. Antenna 305 may receive different bands of incoming RF signals using an antenna switch. For example, a quad-band receiver may be adapted to receive GSM communications, enhanced GSM (EGSM), digital cellular system (DCS) and personal communication system (PCS) signals, although the scope of the present invention is not so limited. In other embodiments, antenna 305 may be adapted for use in a general packet radio service (GPRS) device, a satellite tuner, or a wireless local area network (WLAN) device, for example.

Incoming RF signals are provided to a transceiver 310 which may be a single chip transceiver including both RF components and baseband components. Transceiver 310 may be formed using a complementary metal-oxide-semiconductor (CMOS) process, in some embodiments. As shown in FIG. 6, transceiver 310 includes an RF transceiver 312 and a baseband processor 314. RF transceiver 312 may include receive and transmit portions and may be adapted to provide frequency conversion between the RF spectrum and a baseband. Baseband signals are then provided to a baseband processor 314 for further processing.

In some embodiments, transceiver 310 may correspond to ASIC 15 of FIG. 1. Baseband processor 314, which may correspond to DSP 10 of FIG. 1, may be coupled through a port 318, which in turn may be coupled to an internal speaker 360 to provide voice data to an end user. Port 318 also may be coupled to an internal microphone 370 to receive voice data from the end user.

After processing signals received from RF transceiver 312, baseband processor 314 may provide such signals to various locations within system 300 including, for example, an application processor 320 and a memory 330. Application processor 320 may be a microprocessor, such as a central processing unit (CPU) to control operation of system 300 and further handle processing of application programs, such as personal information management (PIM) programs, email programs, downloaded games, and the like. Memory 330 may include different memory components, such as a flash memory and a read only memory (ROM), although the scope of the present invention is not so limited. Additionally, a display 340 is shown coupled to application processor 320 to provide display of information associated with telephone calls and application programs, for example. Furthermore, a keypad 350 may be present in system 300 to receive user input.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving a configuration message at a mobile station, the configuration message including rate information for radio transmission and an indicator corresponding to an effective radio block for the rate information;

coding a current radio block via a speech encoder and a channel encoder of the mobile station wherein coding via the channel encoder occurs prior to coding via the speech encoder;

configuring the speech encoder and the channel encoder with the rate information after coding the current radio block; and coding the effective radio block with the rate information via the speech encoder and the channel encoder.

2. The method of claim 1, further comprising configuring the speech encoder and the channel encoder during time frames for the current radio block.

3. The method of claim 2, further comprising configuring a speech decoder and a channel decoder of the mobile station during time frames for the effective radio block.

4. The method of claim 1, wherein the rate information comprises a new rate for the radio transmission.

5. A method comprising:

receiving a configuration message from a network at a communication device;

configuring a channel codec and a vocoder of the communication device based upon the configuration message according to a priority so that the channel codec and the vocoder operate in synchronization wherein the priority comprises configuring the channel codec and the vocoder in an uplink direction during time frames of a current communication block before a downlink direction, the configuration in the downlink direction being done during time frames of a next communication block; and scheduling channel encoding of the current communication block to occur prior to the configuring in the uplink direction, wherein rate information of the configuration message is to take effect for next the communication block.

6. The method of claim 5, further comprising scheduling the configuring in the uplink direction upon receipt of a frame interrupt for the current communication block.

7. The method of claim 6, wherein the frame interrupt comprises the first frame interrupt for the current communication block.

8. The method of claim 5, further comprising scheduling the configuring in the downlink direction after receipt of a frame interrupt for the next communication block.

9. The method of claim 8, further comprising configuring in the downlink direction after decoding the current communication block.

10. The method of claim 9, further comprising decoding the next communication block via the channel codec and the vocoder after configuring in the downlink direction.

11. The method of claim 8, wherein the frame interrupt comprises the last frame interrupt for the next communication block.

12. The method of claim 5, wherein the configuration message comprises an adaptive multi-rate message to change a source rate of transmission via the communication device.

13. A mobile station comprising:

an input device to receive voice information from a user;

a digital signal processor (DSP) coupled to the input device to encode the voice information into a radio block, the encoded radio block being speech encoded and channel encoded, wherein the DSP is to prioritize configuration of the speech encoding and the channel encoding to synchronize the speech encoding and the channel encoding; and radio frequency (RF) circuitry coupled to the DSP, wherein the DSP is to process a rate configuration message received from a network, the rate configuration message including a transmission rate and an effective radio block indicator to identify a selected radio block on which the transmission rate is to take effect, wherein the DSP is to configure the speech encoding and the channel encoding during time frames for a first radio block, the first radio block to be transmitted prior to the selected radio block.

14. The mobile station of claim 13, wherein the DSP and the RF circuitry are at least in part integrated within the same integrated circuit.

15. The mobile station of claim 13, wherein the DSP is to configure speech decoding and channel decoding during time frames for the selected radio block.

* * * * *